(12) United States Patent
Shang et al.

(10) Patent No.: US 11,915,415 B2
(45) Date of Patent: Feb. 27, 2024

(54) IMAGE PROCESSING METHOD AND APPARATUS, COMPUTER-READABLE MEDIUM, AND ELECTRONIC DEVICE

(71) Applicant: Tencent Technology (Shenzhen) Company Limited, Guangdong (CN)

(72) Inventors: Hong Shang, Shenzhen (CN); Zhongqian Sun, Shenzhen (CN); Xinghui Fu, Shenzhen (CN); Wei Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 501 days.

(21) Appl. No.: 17/170,504

(22) Filed: Feb. 8, 2021

(65) Prior Publication Data
US 2021/0166385 A1 Jun. 3, 2021

Related U.S. Application Data

(63) Continuation of application No. PCT/CN2019/115928, filed on Nov. 6, 2019.

(30) Foreign Application Priority Data

Nov. 13, 2018 (CN) .......................... 201811348721.6

(51) Int. Cl.
*G06T 7/00* (2017.01)

(52) U.S. Cl.
CPC .. *G06T 7/0012* (2013.01); *G06T 2207/20081* (2013.01); *G06T 2207/20084* (2013.01);
(Continued)

(58) Field of Classification Search
CPC ......... G06T 7/0012; G06T 2207/20081; G06T 2207/20084; G06T 2207/30032; G06T 2207/30096; G06T 2207/10068
See application file for complete search history.

(56) References Cited

U.S. PATENT DOCUMENTS 11,182,877 B2 * 11/2021 Zhu .......................... G06N 3/04
11,517,768 B2 * 12/2022 Hibbard ................... G06N 3/04
(Continued)

FOREIGN PATENT DOCUMENTS

| CN | 108171692 A | 6/2018 |
|---|---|---|
| CN | 108229582 A | 6/2018 |

(Continued)

OTHER PUBLICATIONS

International Search Report Issued in Application No. PCT/CN2019/115928 dated Feb. 12, 2020 with English Machine Translation (5 pages).

(Continued)

*Primary Examiner* — Santiago Garcia
(74) *Attorney, Agent, or Firm* — ARENTFOX SCHIFF LLP

(57) ABSTRACT

Embodiments of this application include an image processing method and apparatus, a non-transitory computer-readable storage medium, and an electronic device. In the image processing method a to-be-predicted medical image is input into a multi-task deep convolutional neural network model. The multi-task deep convolutional neural network model includes an image input layer, a shared layer, and n parallel task output layers. One or more lesion property prediction results of the to-be-predicted medical image is output through one or more of the n task output layers. The multi-task deep convolutional neural network model is trained with n types of medical image training sets, n being a positive integer that is greater than or equal to 2.

20 Claims, 9 Drawing Sheets

(52) U.S. Cl.
CPC .............. *G06T 2207/30032* (2013.01); *G06T 2207/30096* (2013.01)

(56) References Cited

U.S. PATENT DOCUMENTS

| | | | |
|---|---|---|---|
| 2019/0122115 A1* | 4/2019 | Wang | G06F 18/24133 |
| 2019/0122360 A1* | 4/2019 | Zhang | G06F 18/24 |
| 2019/0180136 A1* | 6/2019 | Bousmalis | G06F 18/213 |
| 2020/0012895 A1* | 1/2020 | Zhao | G16H 30/40 |
| 2020/0012898 A1* | 1/2020 | Zhao | G06N 3/084 |
| 2020/0012904 A1* | 1/2020 | Zhao | G06N 3/084 |
| 2020/0082507 A1* | 3/2020 | Fang | G06N 3/045 |
| 2020/0380721 A1* | 12/2020 | Rampal | G06T 7/74 |
| 2021/0019872 A1* | 1/2021 | Kang | G06V 10/40 |

FOREIGN PATENT DOCUMENTS

| | | |
|---|---|---|
| CN | 109523532 A | 3/2019 |
| WO | WO2018184195 A1 | 10/2018 |

OTHER PUBLICATIONS

Written Opinion Issued in Application No. PCT/CN2019/115928 dated Feb. 12, 2020 (4 pages).

* cited by examiner

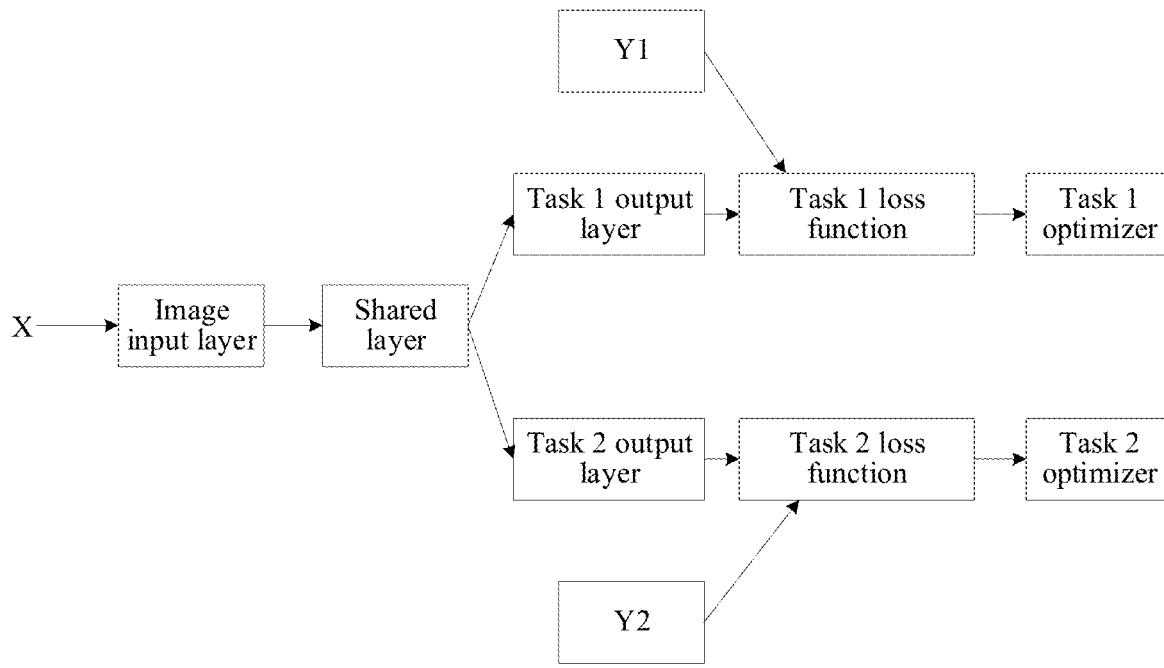

FIG. 10

| Input $m_1$ medical images in the first type of medical image training set to the image input layer of the model, and optimize the task 1 optimizer according to the task 1 loss function, to update a shared parameter of the task 1 and the task 2, and an independent parameter of the task 1 | S421 |

↓

| Input $m_2$ medical images in the second type of medical image training set to the image input layer of the model, and optimize the task 2 optimizer according to the task 2 loss function, to update a shared parameter of the task 1 and the task 2, and an independent parameter of the task 2 | S422 |

FIG. 11

IMAGE PROCESSING METHOD AND APPARATUS, COMPUTER-READABLE MEDIUM, AND ELECTRONIC DEVICE

RELATED APPLICATION

This application is a continuation of International Application No. PCT/CN2019/115928, filed on Nov. 6, 2019, which claims priority to Chinese Patent Application No. 201811348721.6, entitled "IMAGE PROCESSING METHOD AND APPARATUS, COMPUTER-READABLE MEDIUM, AND ELECTRONIC DEVICE" and filed on Nov. 13, 2018. The entire disclosures of the prior applications are hereby incorporated by reference in their entirety.

FIELD OF THE TECHNOLOGY

This application relates to the field of computer technologies, including an image processing method and apparatus, a computer-readable medium, and an electronic device.

BACKGROUND OF THE DISCLOSURE

With aggravation of an aging population in many countries in the world, load on medical systems is increasing day by day, far exceeding a growth rate of medical staff, resulting in scarcity of medical resources. Moreover, the medical resources are distributed very unevenly currently, and are mainly concentrated in large-scale grade-A tertiary hospitals in first-tier cities. Therefore, using technologies to create medical resources has become an inevitable choice for governments and markets.

SUMMARY

Embodiments of this application includes an image processing method and apparatus, a non-transitory computer-readable storage medium, and an electronic device, to improve lesion property prediction accuracy.

Other features and advantages of this application become apparent through the following detailed descriptions, or may be partially learned through the practice of the embodiments of this application.

In an embodiment of this application an image processing method is provided. In the method a to-be-predicted medical image is input into a multi-task deep convolutional neural network model. The multi-task deep convolutional neural network model includes an image input layer, a shared layer, and n parallel task output layers. One or more lesion property prediction results of the to-be-predicted medical image is output through one or more of the n task output layers. The multi-task deep convolutional neural network model is trained with n types of medical image training sets, n being a positive integer that is greater than or equal to 2.

In an embodiment of this application provide an image processing apparatus is provided. The image processing apparatus includes processing circuitry that is configured to input a to-be-predicted medical image into a multi-task deep convolutional neural network model. The multi-task deep convolutional neural network model includes an image input layer, a shared layer, and n parallel task output layers. One or more lesion property prediction results of the to-be-predicted medical image is output through one or more of the n task output layers. The multi-task deep convolutional neural network model is trained with n types of medical image training sets, n being a positive integer greater than or equal to 2.

In an embodiment of this application provide a non-transitory computer-readable storage medium is provided. The non-transitory computer-readable storage medium stores instructions which when executed by at least one processor cause the at least one processor to perform the image processing method according to the foregoing embodiments.

The embodiments of this application provide an electronic device, including: one or more processors; and a storage apparatus, configured to store one or more programs, the one or more programs, when executed by the one or more processors, causing the one or more processors to implement the image processing method according to the foregoing embodiments.

It is to be understood that the foregoing general descriptions and the following detailed descriptions are only exemplary and explanatory, and are not intended to limit the embodiments of this application.

BRIEF DESCRIPTION OF THE DRAWINGS

Accompanying drawings herein are incorporated into a specification and constitute a part of this specification, show embodiments that conform to this application, and are used to describe a principle of this application together with this specification. The accompanying drawings in the following description show merely some embodiments of this application, and a person of ordinary skill in the art may still derive other drawings from these accompanying drawings. In the accompanying drawings:

FIG. 10 is a schematic diagram of a multi-task deep convolutional neural network model according to an embodiment of this application.

FIG. 11 is a schematic diagram of a processing procedure of step S420 shown in FIG. 4 in an embodiment.

DESCRIPTION OF EMBODIMENTS

Exemplary implementations are now described more comprehensively with reference to the accompanying drawings. However, the examples of implementations may be implemented in a plurality of forms, and it is not to be understood as being limited to the examples described herein. Conversely, the implementations are provided to make this application more comprehensive and complete, and comprehensively convey the idea of the examples of the implementations to a person skilled in the art.

In addition, the described characteristics, structures, or features may be combined in one or more embodiments in any appropriate manner. In the following descriptions, details are provided to give a more comprehensive understanding of the embodiments of this application. However, a person of ordinary skill in the art is to be aware that, the technical solutions in this application may be implemented without one or more of the particular details, or another method, unit, apparatus, or step may be used. In other cases, related methods, apparatuses, implementations, or operations are not shown or described in detail, in order not to obscure the aspects of this application.

The block diagrams shown in the accompany drawings are merely functional entities and do not necessarily correspond to physically independent entities. That is, the functional entities may be implemented in a software form, or in processing circuitry such as one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

An important entry point for medical resources is medical imaging. Although high-quality medical imaging devices are relatively popular, doctors capable of analyzing imaging results are limited. In addition, a large number of medical images that are continuously generated cause work fatigue of the doctors, and increased missed diagnosis and misdiagnosis rates. Therefore, a new image processing method and apparatus, a new computer-readable medium, and a new electronic device are required, to improve accuracy of image prediction results.

Figure 1:
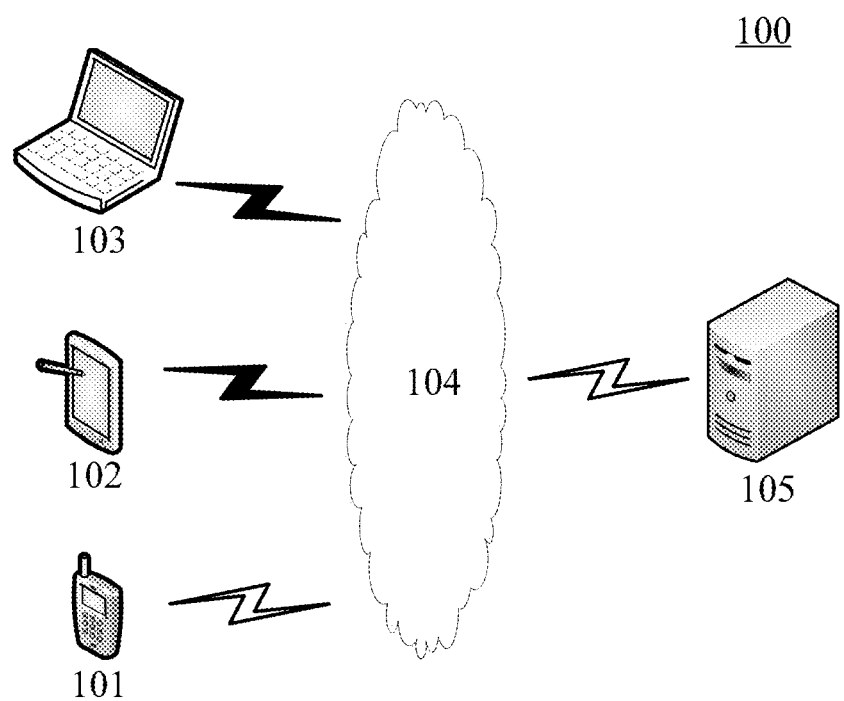
FIG. 1 is a schematic diagram of an exemplary system architecture to which an image processing method or an image processing apparatus according to an embodiment of this application may be applied.

FIG. 1 is a schematic diagram of an exemplary system architecture 100 to which an image processing method or an image processing apparatus according to an embodiment of this application may be applied.

As shown in FIG. 1, the system architecture 100 may include one or more of terminal devices 101, 102, and 103, a network 104, and a server 105. The network 104 is a medium configured to provide communication links between the terminal devices 101, 102, and 103, and the server 105. The network 104 may include various connection types, such as a wired communication link, a wireless communication link, or a fiber optic cable.

It is to be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 105 may be a server cluster including a plurality of servers or the like.

A user may interact with the server 105 through the network 104 by using the terminal devices 101, 102, and 103, to receive or send messages. The terminal devices 101, 102, and 103 may be various electronic devices having display screens, including, but not limited to, smartphones, tablet computers, portable computers, desktop computers, digital cinema projectors, and the like.

The server 105 may be a server configured to provide various services. For example, the user sends a to-be-predicted medical image to the server 105 by using the terminal device 103 (or the terminal device 101 or 102). The server 105 can predict lesion properties in the medical image based on the medical image through a model trained on the server 105, and feed back a prediction result (for example, the corresponding disease type information) to the terminal device 103. Therefore, the user can watch the corresponding prediction result based on content displayed on the terminal device 103.

Figures 2, 3:
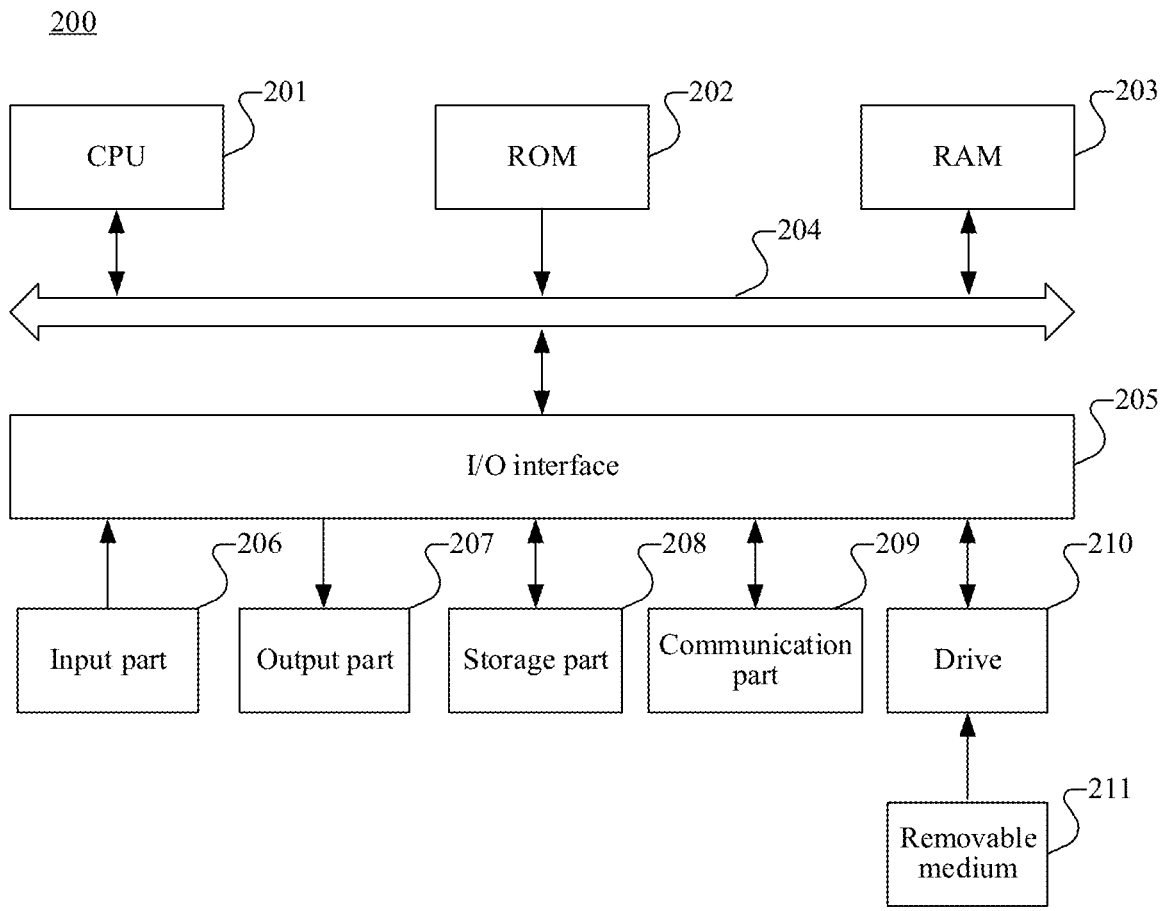
FIG. 2 is a schematic structural diagram of a computer system adapted to implement an electronic device according to an embodiment of this application.
FIG. 3 is a schematic flowchart of an image processing method according to an embodiment of this application.

FIG. 2 is a schematic structural diagram of a computer system adapted to implement an electronic device according to an embodiment of this application.

A computer system 200 of the electronic device shown in FIG. 2 is merely an example, and does not constitute any limitation on functions and use ranges of the embodiments of this application.

As shown in FIG. 2, the computer system 200 includes a central processing unit (CPU) 201. The CPU 201 can perform various appropriate actions and processing according to a program stored in a read-only memory (ROM) 202 or a program loaded into a random access memory (RAM) 203 from a storage part 208. The RAM 203 further stores various programs and data required for operating the system. The CPU 201, the ROM 202, and the RAM 203 are connected to each other through a bus 204. An input/output (I/O) interface 205 is also connected to the bus 204.

Components connected to the I/O interface 205 are as the following: an input part 206 including a keyboard, a mouse or the like; an output part 207 including a cathode ray tube (CRT), a liquid crystal display (LCD), a speaker or the like; a storage part 208 including a hard disk or the like; and a communication part 209 of a network interface card, including a LAN card, a modem or the like. The communication part 209 performs communication processing via a network such as the Internet. A drive 210 is also connected to the I/O interface 205 as required. A removable medium 211, such as a magnetic disk, an optical disk, a magneto-optical disk, a semiconductor memory or the like, is installed on the drive 210 as needed, so that a computer program read therefrom is installed into the storage part 208 as needed.

According to an embodiment of this application, the processes described in the following by referring to the flowcharts may be implemented as computer software programs. For example, this embodiment of this application includes a computer program product, the computer program product includes a computer program carried on a computer-readable medium (e.g., a non-transitory computer-readable medium), and the computer program includes program code used for performing the methods shown in the flowcharts. In such an embodiment, by using the communication part 209, the computer program may be downloaded and installed from a network, and/or be installed from the removable medium 211. When the computer program is executed by the CPU 201, various functions defined in the method and/or apparatus of this application are executed.

The computer-readable medium shown in this application may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code contained in the computer-readable medium may be transmitted by using any appropriate medium, including but not limited to: a wireless medium, a wire, an optical cable, RF, any suitable combination thereof, or the like.

The flowcharts and block diagrams in the accompanying drawings show architectures, functions, and operations that may be implemented for the method, the apparatus, and the computer program product according to the embodiments of this application. In this regard, each box in the flowchart or the block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

A related module and/or submodule and/or unit described in the embodiments of this application may be implemented in a software manner, or may be implemented in a hardware manner, and the described module and/or submodule and/or unit can also be set in a processor. Names of the modules and/or submodules and/or units do not constitute a limitation on the modules and/or submodules and/or units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the following embodiments. For example, the electronic device may implement steps shown in FIG. 3, or FIG. 5, or FIG. 11.

FIG. 3 is a schematic flowchart of an image processing method according to an embodiment of this application. The method steps i may be executed by a terminal device, or by a server, or by the terminal device and the server interactively, for example, by the terminal device 103 or the server 105 in FIG. 1. However, embodiments of this application are not limited thereto.

As shown in FIG. 3, the image processing method provided by an embodiment of this application may include the following steps.

In step S310, a to-be-predicted medical image is input into a model, the model being a multi-task deep convolutional neural network model, the model including an image input layer, a shared layer, and n parallel task output layers.

n is a positive integer greater than or equal to 2.

In an embodiment of this application, the to-be-predicted medical image may be collected by a medical imaging device.

In an embodiment of this application, the medical imaging device may be any type of imaging device applied to medical treatment. This is not limited in this embodiment of this application. When different types of medical imaging devices are used, types of collected medical images may change accordingly. In each of the following embodiments, that the medical imaging device is an endoscope is taken as an example for illustration.

The endoscope is a detecting instrument that integrates traditional optics, ergonomics, precision machinery, modern electronics, mathematics, software, and the like. The endoscope includes an image sensor, an optical lens, an illumination source, a mechanical device, and the like, and can enter the stomach of a patient through the mouth of the patient or enter the body of the patient through another natural orifice of the patient. The endoscope can be used to see a lesion that cannot be displayed through X-rays, and is thus very useful to a doctor. For example, with the help of the endoscope, the doctor may observe ulcers or tumors in the stomach and formulate a treatment plan accordingly.

According to different parts reached by endoscopes, the endoscopes may be further classified into: otolaryngology endoscope, oral endoscope, dental endoscope, neuroscope, urethro-cystoscope, resectoscope, laparoscope, arthroscope, sinoscope, laryngoscope, and the like. In an embodiment of this application, a colonoscope used for colorectal examination is taken as an example for illustration. However, embodiments of this application are not limited thereto.

In an embodiment of this application, the endoscope includes a plurality of modes in clinical use. The most common modes are a white light mode and a narrow band imaging (NBI) mode. The white light mode can be one of the common modes of endoscopic imaging, and visible light is used for imaging. In the NBI mode, a wavelength of incident light is changed by installing a special narrow-band filter. The narrow band imaging has a plurality of wavelengths. Different wavelengths have different mucosal penetrability, and mucosal manifestation blood vessels are observed more carefully. An illumination light wave in the NBI mode has a wavelength narrower than that of a usual white light spectrum, and therefore is referred to as a narrow-band light source.

In an embodiment of this application, in the NBI mode, blue light with a wavelength of 415 nm and green light with a wavelength of 540 nm may be used for imaging. Because hemoglobin strongly absorbs light in this band, blood vessels are dark, thereby being conducive to observing details of a digestive tract surface.

The white light mode is usually a default imaging mode, and is used for finding and locating lesions. After a user (e.g., a doctor) locates a lesion by using the white light mode, the user may switch to the NBI mode, and use blue light and green light for imaging to make blood vessels dark, making it easier to observe the details of the digestive tract surface to identify a disease type.

In an embodiment of this application, one or more to-be-predicted medical images may be inputted into the model. That one or more medical images inputted to the image input layer of the model are white light images and narrow band images (also referred to as NBI images) is taken as an example for illustration. However, this is merely an example and is not intended to limit embodiments of this application.

In an exemplary embodiment, the shared layer may include a convolution layer, a max pooling layer, a dense block 1, a transition layer 1, a dense block 2, a transition layer 2, a dense block 3, a transition layer 3, a dense block 4, and a global average pooling layer that are sequentially connected. A more detailed description is provided with reference to the embodiment illustrated in FIG. 13.

In step S320, one or more lesion property prediction results of the to-be-predicted medical image is output through any one or more of the n task output layers.

For example, assuming that the to-be-predicted medical image inputted to the model is the white light image, a lesion property prediction result of the lesion in the white light image is outputted through a task 1 output layer of the model. In another example, assuming that the to-be-predicted medical image inputted to the model is the NBI image, a lesion property prediction result of the lesion in the NBI image is outputted through a task 2 output layer of the model. In still another example, assuming that the doctor sequentially inputs the white light image and the NBI image to the model, the model may output the lesion property prediction result of the lesion in the white light image and the lesion property prediction result of the lesion in the NBI image respectively through the task 1 output layer and the task 2 output layer, to be provided to the doctor for reference at the same time.

In an embodiment of this application, the white light image can be used not only to locate the lesion, but also to predict the lesion property through the model.

The model is obtained through training of n types of medical image training sets. That is, one type of medical image training set corresponds to one task output layer of the model, and there is a one-to-one correspondence between n types of medical image training sets and n task output layers.

In an embodiment of this application, in a case that the endoscope is a colonoscope, the lesion property prediction results may include any one of normality, non-adenomatous polyps, adenomatous polyps, adenocarcinoma, and the like. The classification of the lesion property has clinical guiding significance. For a patient with a prediction result of adenomatous polyps and adenocarcinoma, biopsy and pathological examination need to be further performed generally, while a patient with a prediction result of non-adenomatous polyps only needs to be observed continuously.

Types of the above lesion property prediction results may be adjusted according to actual application scenarios. When different types of endoscopes are used to examine different parts of the patient, classification of the lesion property prediction results may be changed accordingly.

According to the image processing method provided in an embodiment of this application, the multi-task deep convolutional neural network model obtained through training of n types of medical image training sets is used to predict one or more lesion property prediction results of any one or more of a plurality of medical images inputted to the model. Accuracy of classifying images can be improved. When applied to an automatic diagnosis scenario of a medical image such as an endoscopic image, the method can be used to assist the doctor in improving diagnosis efficiency and accuracy.

Figure 4:
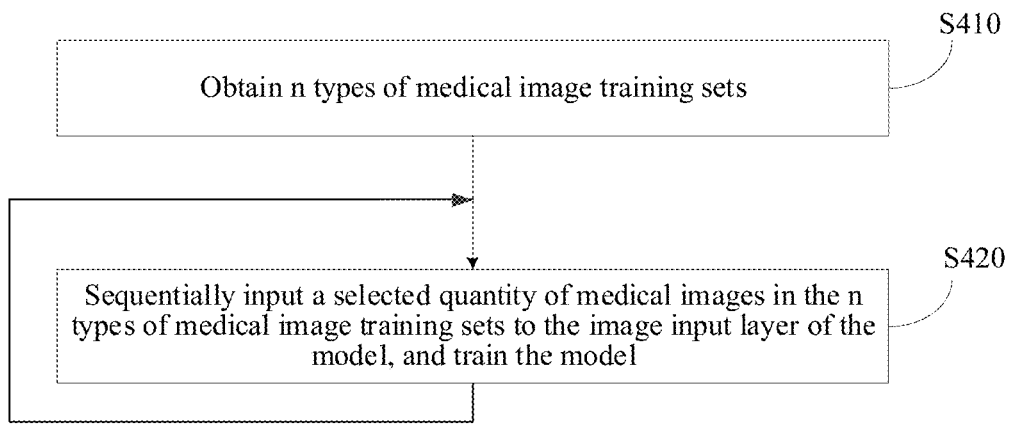
FIG. 4 is a schematic flowchart of an image processing method according to another embodiment of this application.

FIG. 4 is a schematic flowchart of an image processing method according to another embodiment of this application. The method steps may be executed by a terminal device, or by a server, or by the terminal device and the server interactively, for example, by the server 105 in FIG. 1. However, embodiments of this application are not limited thereto.

As shown in FIG. 4, the image processing method provided in an embodiment of this application differs from the embodiment shown in FIG. 3 in that the method may further include a model training step, and the model training step may further include the following steps.

In step S410, n types of medical image training sets are obtained.

In an embodiment of this application, a value of n may be determined according to a quantity of mode types of a medical imaging device used to collect the medical image training sets. However, this example is not intended to limit the embodiments of this application.

The following embodiment takes an example for illustration in which n=2, the n types of medical image training sets include a first type of medical image training set and a second type of medical image training set, the first type of medical image training set is a white light image training set, and the second type of medical image training set is a narrow band image training set.

In step S420, a selected quantity of medical images in the n types of medical image training sets is sequentially input into the image input layer of the model, and the model is trained.

In an embodiment of this application, $m_1$ medical images in the first type of medical image training set may be first inputted to the model to train the model; $m_2$ medical images in the second type of medical image training set may be then inputted to the model to train the model; . . . , and so on, and $m_n$ medical images in an $n^{th}$ type of medical image training set are finally inputted into the model to train the model.

$m_1, m_2, \ldots,$ and $m_n$ are all positive integers greater than or equal to 1. Values of $m_1, m_2, \ldots,$ and $m_n$ may be partially the same, or completely the same, or completely different. Similarly, quantities of medical images in all medical image training sets may alternatively be partially the same, or completely the same, or completely different. These examples are not intended to limit the embodiments of this application.

Continuing to refer to FIG. 4, the method may further include: repeatedly performing the above step S420, to continue to train the model.

For example, n=2 and the n types of medical image training sets that include a white light image training set and a narrow band image training set are taken as an example. It is assumed that there are 10,000 white light images in the white light image training set, there are 2000 narrow band images in the narrow band image training set. For the first time, 256 white light images are selected from the white light image training set for training, and for the second time, 64 narrow band images are selected from the narrow band image training set for training; for the third time, 256 white light images are selected from the white light image training set for training, and for the fourth time, 64 narrow band images are selected from the narrow band image training set for training; . . . , and so on, that is, parts of training images are selected respectively from the white light image training set and the narrow band image training set to train the model alternately in turn. Finally, all images in each medical image training set, such as 10,000 white light images and/or 2,000 narrow band images, may be used for training at least once. Normally, each image in the training set is used for training in the magnitude order of 100 times.

In an exemplary embodiment, the method may further include a model pre-training step, also referred to as transfer learning, that is, pre-training the model by using a natural image training set.

In an embodiment of this application, natural images in the natural image training set refer to pictures in daily life scenes, such as people images, animal images, and landscape images captured by a mobile phone. The pictures are labeled and then added to the natural image training set.

In an embodiment of this application, for example, the natural image training set may be first used to pre-train the model, to obtain an initial parameter of the model; and then a medical image training set that is collected by a medical imaging device such as an endoscope and that is accurately labeled is used for training, to fine-tune and optimize the initial parameter.

The medical image training set collected by the endoscope is not directly used to train the model because, on the one hand, an effect of deep learning on small data sets can be effectively improved through transfer learning. On the other hand, patient privacy is considered and limited. An endoscopic image is acquired at a high cost and in a long cycle. Especially for an accurately labeled endoscopic image, a biopsy result is usually required to serve as a true label of a final endoscopic image, increasing difficulty of preparing training data.

Figure 5:
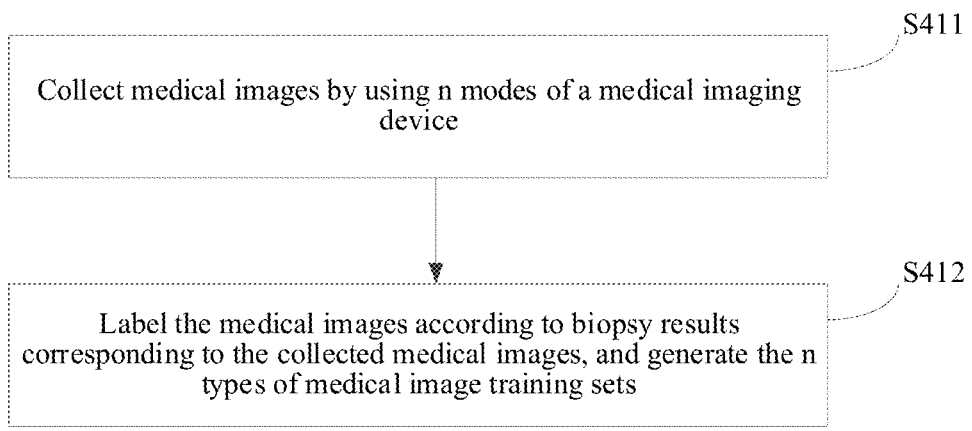
FIG. 5 is a schematic diagram of a processing procedure of step S410 shown in FIG. 4 in an embodiment.

FIG. 5 is a schematic diagram of a processing procedure of step S410 shown in FIG. 4 in an embodiment.

As shown in FIG. 5, in an embodiment of this application, step S410 in the above embodiment shown in FIG. 4 may further include the following steps.

In step S411, medical images are collected by using n modes of a medical imaging device.

In this embodiment of this application, the medical imaging device is an endoscope, and a white light mode and a narrow band imaging mode of the endoscope are taken as an example, to collect medical images in the white light mode and the narrow band imaging mode respectively.

In step S412, the medical images are labeled according to biopsy results corresponding to the collected medical images, and the n types of medical image training sets are generated.

Each imaging mode corresponds to a medical image training set. The white light mode and the narrow band imaging mode of the endoscope are taken as an example, to respectively generate a white light image training set and a narrow band image training set.

In an embodiment of this application, in a process of labeling the endoscopic images, there is a possibility of misjudgment when labeling is performed according to a result of human judgment. Therefore, medical methods such as biopsy are used for diagnosis herein. A biopsy result is used as a label of each medical image, improving accuracy of a labeling result.

Figure 6:
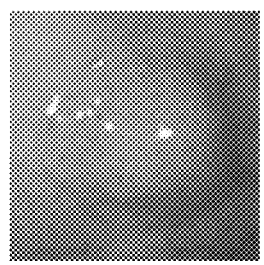
FIG. 6 is a schematic diagram of a white light image according to an embodiment of this application.
Figure 7:
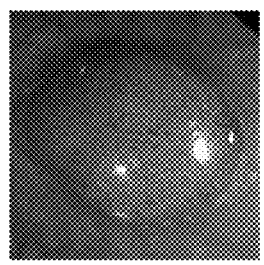
FIG. 7 is a schematic diagram of a narrow band image according to an embodiment of this application.

FIG. 6 is a schematic diagram of a white light image according to an embodiment of this application. FIG. 7 is a schematic diagram of a narrow band image (also referred to as NBI image) according to an embodiment of this application. It can be seen from FIG. 6 and FIG. 7 that there is a difference between images obtained in the two modes of the endoscope (e.g., the NBI image has a different overall tone, and a clearer surface blood vessel texture). Meanwhile, there is further a similarity between the images obtained in the two modes (e.g., lesions in the two images are round and convex relative to surrounding tissue).

Figure 8:
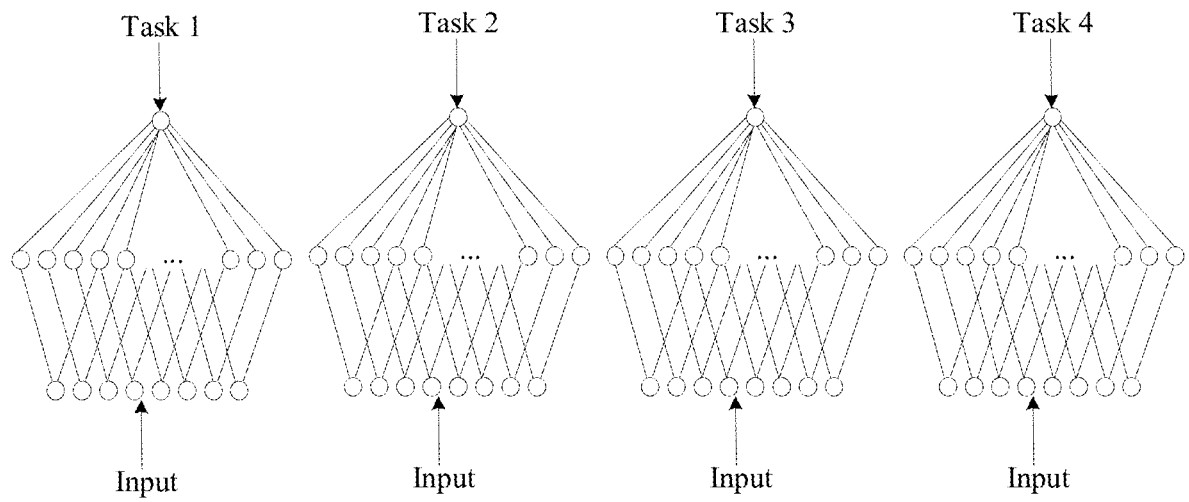
FIG. 8 is a schematic diagram of a single-task model.

FIG. 8 is a schematic diagram of a single-task model.

As shown in FIG. 8, a task 1, a task 2, a task 3, and a task 4 are taken as an example herein (an actual quantity of tasks may be designed according to a specific application scenario). For the tasks, each of respective inputted image training sets is used to individually train a model.

A neural network is taken as an example herein. In a traditional machine learning method, a model is independently trained for each task. For example, the white light image training set and the NBI image training set are used to independently train respective models.

The single-task model of FIG. 8 has at least the following shortcomings:

First, a function of a single model is incomplete. The model may merely provide white light image-assisted diagnosis, or may merely provide NBI image-assisted diagnosis. However, a clinician may switch between the two modes at any time during an operation, so that assisted diagnosis in both of the two modes is needed.

Second, models are trained separately by using respective image training sets, and a similarity between data of the two modes is not used. In this way, more endoscopic images and accurate labels thereof are needed to serve as training data sets. However, it can be apparent according to the description in the foregoing embodiment that, endoscopic images and accurate labels of the endoscopic images are acquired in a long cycle and at a high cost, especially for NBI images, whose acquisition and labeling are more difficult compared with white light images.

Figure 9:
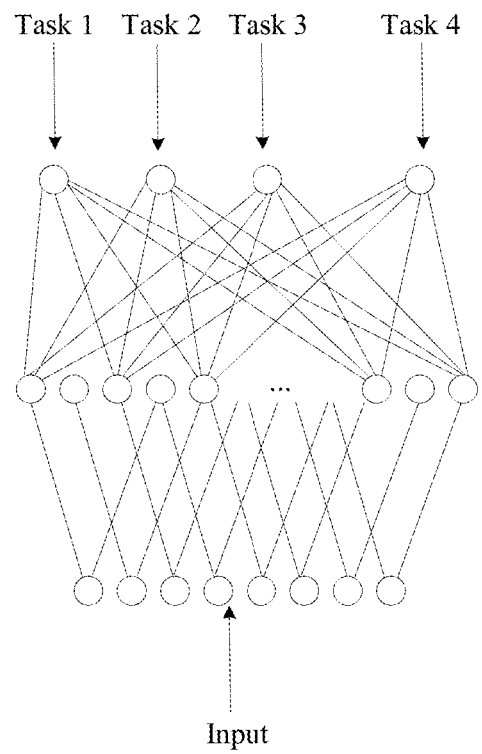
FIG. 9 is a schematic diagram of a multi-task model according to an embodiment of this application.

FIG. 9 is a schematic diagram of a multi-task model according to an embodiment of this application.

As shown in FIG. 9, the multi-task model provided in this embodiment of this application is used together with all inputted medical image training sets of a task 1, a task 2, a task 3, and a task 4 (a quantity of tasks is merely for illustration, and this is not intended to limit the scope of this application) to train the same model.

According to the multi-task model adopted in this embodiment of this application, for tasks with a similarity, the tasks may share a part of model parameters (briefly referred to as shared parameters below). However, the tasks have respective independent output layer parameters.

Shared parameters use all medical image training sets of all tasks, so that an amount of training data is increased, and meanwhile unique noise of each training data set is canceled, thereby improving the generalization ability of the model, and reducing overfitting. An independent output layer may select the most relevant feature for a task from a shared part, and learn a unique classification boundary of each task, so that the model has sufficient flexibility, and can obtain high accuracy for a complex task such as image recognition.

FIG. 10 is a schematic diagram of a multi-task deep convolutional neural network model according to another embodiment of this application.

As shown in FIG. 10, two tasks are taken as an example for illustration herein. The multi-task deep convolutional neural network model may include an image input layer and a shared layer; a task 1 output layer, a task 1 loss function, and a task 1 optimizer that correspond to a task 1; and a task 2 output layer, a task 2 loss function, and a task 2 optimizer that correspond to a task 2.

In an embodiment of this application, the shared layer may differ as the adopted deep convolutional neural network differs.

X represents an input image inputted to an image input layer of the multi-task deep convolutional neural network model. Y1 represents a true label of each medical image, such as a white light image, in the first type of medical image training set corresponding to the task 1. Y2 represents a true label of each medical image, such as an NBI training image, in the second type of medical image training set corresponding to the task 2.

In an embodiment of this application, in a model training process, when the medical image in the first type of medical image training set is inputted into the model, the task 1 loss function may be obtained according to a prediction result outputted by the task 1 output layer and the true label Y1 of the task 1; when the medical image in the second type of medical image training set is inputted into the model, the task 2 loss function may be obtained according to a prediction result outputted by the task 2 output layer and the true label Y2 of the task 2; and the task 1 loss function and the task 2 loss function are optimized through the task 1 optimizer and the task 2 optimizer respectively, to complete the model training process.

For example, for each task, a loss function (also referred to as an optimization function) is established, and a specific form thereof may be:

$$\text{Loss} = \alpha * \text{cross\_entropy\_loss} + \beta * \text{regularization\_term} \quad (1)$$

Loss in the above formula (1) represents a loss function of a corresponding task, $\alpha$ represents a weight of each task cross_entropy_loss, and weights of different tasks may be different; $\beta$ is a weight of a regularization function, and different tasks may use a uniform value; cross_entropy_loss is a cross-entropy loss function, and a value thereof is smaller when a difference between a prediction result and a true label is smaller; regularization_term may use an L2 norm of all trainable parameters, and a value thereof is smaller when an absolute value of a parameter is smaller.

In an embodiment of this application, an example is taken in which lesion property predictions of the white light image and the NBI image are respectively the task 1 and the task 2. The tasks include respective output layers, loss functions, and optimizers.

In an embodiment of this application, a method of stochastic gradient descent (however, this embodiment of this application is not limited thereto) may be used for training. A part of a data set of one medical image training set of the white light image training set and the NBI image training set is inputted each time, and an optimizer corresponding to this task is optimized, to update shared parameters of an overlapping part of the two tasks and respective unique independent parameters of the corresponding tasks. In the training process, the two tasks of white light and NBI alternate.

In an embodiment of this application, the similarity between the white light image and the NBI image is used, a method of multi-task learning combined with deep learning is adopted, the multi-task deep convolutional neural network model is established, and the white light image training set and the NBI image training set are used as all input training images of the entire model. Prediction accuracy of each task may be enhanced with the same amount of training data.

FIG. 11 is a schematic diagram of a processing procedure of step S420 shown in FIG. 4 in an embodiment. An example is taken for illustration in which n is equal to 2, the n types of medical image training sets include a first type of medical image training set and a second type of medical image training set, two task output layers in the model respectively correspond to a task 1 and a task 2, the task 1 includes a task 1 loss function and a task 1 optimizer, and the task 2 includes a task 2 loss function and a task 2 optimizer.

As shown in FIG. 11, in an embodiment of this application, step S420 may further include the following steps.

In step S421, $m_1$ medical images in the first type of medical image training set in input into the image input layer of the model, and the task 1 optimizer is optimized according to the task 1 loss function, to update a shared parameter of the task 1 and the task 2, and an independent parameter of the task 1.

In step S422, $m_2$ medical images in the second type of medical image training set are input into the image input layer of the model, and the task 2 optimizer is optimized according to the task 2 loss function, to update a shared parameter of the task 1 and the task 2, and an independent parameter of the task 2.

Both $m_1$ and $m_2$ are positive integers greater than or equal to 1.

In an embodiment of this application, in a case that the first type of medical image training set is a white light image training set, and the second type of medical image training set is a narrow band image training set, $m_2$ is smaller than $m_1$. However, embodiments of this application are not limited thereto.

Figure 12:
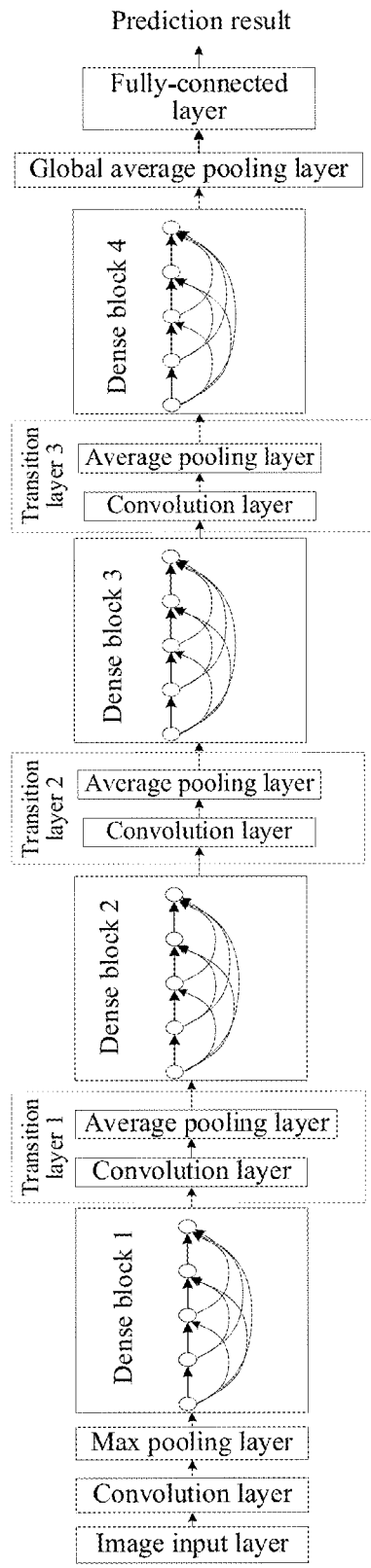
FIG. 12 is a schematic diagram of a network structure of DenseNet.

FIG. 12 is a schematic diagram of a network structure of a Deep Convolutional Neural Network such as DenseNet (Densely Connected Convolutional Network).

As shown in FIG. 12, different from a previous manual feature extraction method, the convolutional neural network automates and optimizes feature extraction, realizes end-to-end training, reduces complexity of implementation, and improves a final effect.

The specific network structure of the deep convolutional neural network being DenseNet is taken as an example. The structure is characterized in that each layer may reuse features with different abstraction degrees of all previous layers, thereby avoiding repeated learning of similar features and improving effectiveness of parameters. In addition, links between different layers contribute to transfer of gradients in the training process, so that an optimization problem of the deep network is resolved.

As shown in FIG. 12, the DenseNet may include an image input layer, a convolution layer, a max pooling layer, a dense block 1, a transition layer 1, a dense block 2, a transition layer 2, a dense block 3, a transition layer 3, a dense block 4, a global average pooling layer, and a fully-connected layer (full-connected or fully connect), and the fully-connected layer outputs a prediction result. Each transition layer may further include an average pooling layer and a convolution layer.

Figure 13:
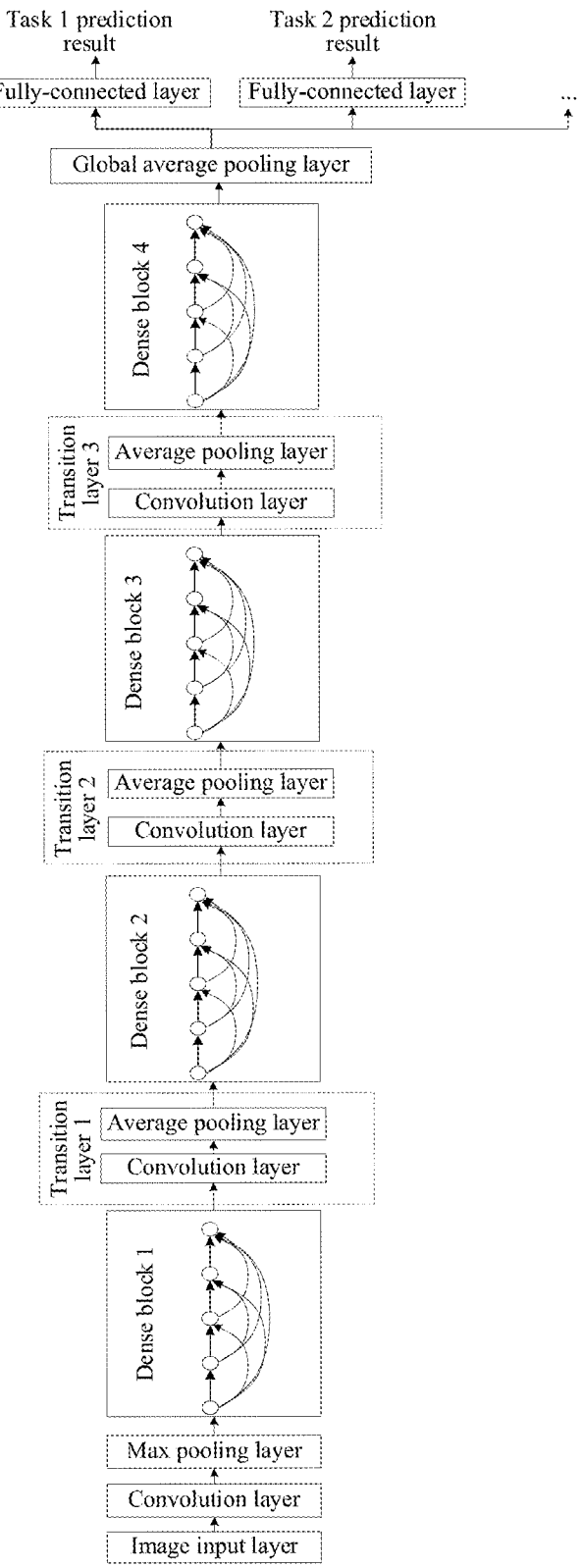
FIG. 13 is a schematic diagram of a multi-task deep convolutional neural network model according to another embodiment of this application.

FIG. 13 is a schematic diagram of a multi-task deep convolutional neural network model according to another embodiment of this application.

In this embodiment of this application, multi-task learning is combined with deep learning. A new network structure is shown in FIG. 13. A last layer, that is, the fully-connected layer, of the DenseNet network structure is divided into a plurality of parallel fully-connected layers (a quantity of the parallel fully-connected layers depends on a quantity of tasks). The tasks have respective output layer parameters.

As shown in FIG. 13, the multi-task deep convolutional neural network model provided in an embodiment of this application may include an image input layer, a convolution layer, a max pooling layer, a dense block 1, a transition layer 1, a dense block 2, a transition layer 2, a dense block 3, a transition layer 3, a dense block 4, a global average pooling layer, and a plurality of parallel fully-connected layers. The plurality of parallel fully-connected layers are each used for outputting a task 1 prediction result and a task 2 prediction result, and the like.

The convolution layer, the max pooling layer, the dense block 1, the transition layer 1, the dense block 2, the transition layer 2, the dense block 3, the transition layer 3, the dense block 4, and the global average pooling layer collectively constitute the shared layer of the model. Each fully-connected layer corresponds to one task output layer.

When a different deep convolutional neural network such as a residual neural network (ResNet) is combined with multi-task learning, a last layer of a specific network structure of the ResNet may be divided into a plurality of parallel task output layers correspondingly, to form an updated multi-task deep convolutional neural network model. This is merely an example and is not intended to limit in the embodiments of this application.

Although 5 nodes are shown in each dense block in FIG. 13, in fact, a quantity of nodes in each dense block is not necessarily 5, or may be, for example, 6.

In the embodiment shown in FIG. 13, each transition layer may further include an average pooling layer and a convolution layer.

In the embodiment shown in FIG. 13, each dense block may include K bottleneck layers, and input of an $i^{th}$ bottleneck layer in each dense block includes output of a first to an $(i-1)^{th}$ bottleneck layers in the corresponding dense block. i is a positive integer greater than or equal to 2 and less than or equal to K (i.e., $2 \leq i \leq K$); and K is a positive integer greater than or equal to 1.

In an exemplary embodiment, each bottleneck layer may further include a batch normalization layer 1 (Batch Normalization 1), a ReLu 1 (ReLu is an abbreviation of Rectified Linear Unit), a convolution layer 1 (Cony 1), a dropout layer 1 (Dropout 1), a batch normalization layer 2 (Batch Normalization 2), a ReLu 2, a convolution layer 2 (Cony 2), and a dropout layer 2 (Dropout 2) that are sequentially connected.

Each layer of each dense block uses features of all previous layers as input. For a traditional network with L (L is a positive integer greater than or equal to 1) layers, there are a total of L connections; and for the DenseNet, there are L*(L+1)/2 connections. Accuracy of prediction results of the model can be improved by deepening the network structure. The first thing to deepen the network structure is to resolve a problem of gradient vanishing. A solution adopted by the DenseNet is to shorten a connection between a front layer and a back layer as much as possible. That is, this structure further uses shortcut connections, to connect all layers to each other, thereby maximizing flow of information and gradients. In this new architecture, input of each layer contains feature maps of all earlier layers, and output thereof is passed to each subsequent layer. These feature maps are joined together through depth concatenation. This architecture further supports "feature reuse", making the network more "parameter-efficient". Using depth concatenation can increase diversity of output, to further promote reuse of features.

In an embodiment of this application, the DenseNet is combined with multi-task learning, and the following advantages of the DenseNet are used: effectively resolving the problem of gradient vanishing; strengthening feature propagation; supporting feature reuse; and greatly reducing a quantity of parameters.

Meanwhile, this connection method makes transfer of features and gradients more effective, and it is easier to train the network. The problem of gradient vanishing is more likely to occur in a case of larger network depth because input information and gradient information are transferred between many layers. However, the current dense connection is equivalent to each layer directly connecting input and loss, thus alleviating the gradient vanishing phenomenon, so that deeper networks are not a problem.

Specifically, after parameter tuning and optimization, a specific structure of the multi-task deep convolutional neural network model in this embodiment of this application is determined as shown in Table 1 below.

TABLE 1

| Layers | Size | Description |
| --- | --- | --- |
| Image Input | 3 × 227 × 227 | RGB three channels |
| Convolution | 96 × 114 × 114 | 7 × 7 conv, stride 2 |
| Max Pooling | 96 × 56 × 56 | 3 × 3 max pool, stride 2 |
| Dense Block 1 | 384 × 56 × 56 | bottleneck layer ×6 |
| Transition Layer 1 | 192 × 28 × 28 | 1 × 1 conv, 2 × 2 average pool, stride 2 |
| Dense Block 2 | 480 × 28 × 28 | bottleneck layer ×6 |
| Transition Layer 2 | 240 × 14 × 14 | 1 × 1 conv, 2 × 2 average pool, stride 2 |
| Dense Block 3 | 528 × 14 × 14 | bottleneck layer ×6 |
| Transition Layer 3 | 264 × 7 × 7 | 1 × 1 conv, 2 × 2 average pool, stride 2 |
| Dense Block 4 | 552 × 7 × 7 | bottleneck layer ×6 |
| Classification layer | 552 | 7 × 7 global average pool |
|  | 4 | 4 fully-connected, softmax |

In an embodiment of this application, a quantity of features in transition layers is further reduced.

In an embodiment of this application, another important parameter in the multi-task deep convolutional neural network model is growth-rate that may be represented by k. k may be set to 48. However, embodiments of this application are not limited thereto. For example, k may be alternatively set to another value such as 32. k represents a quantity of feature maps outputted by each layer in each dense block.

In an embodiment of this application, a specific structure of a unit "bottleneck layer" may be shown in Table 2 below:

TABLE 2

| bottleneck layer |
| --- |
| Batch Normalization 1 |
| ReLu 1 |
| Conv 1 × 1 |
| Dropout 1 |
| Batch Normalization 2 |
| ReLu 2 |
| Conv 3 × 3 |
| Dropout 2 |

As shown in Table 2, a dropout operation may be further used to randomly reduce branches and avoid overfitting.

According to the image processing method provided in an embodiment of this application, by combining multi-task learning and deep learning, and using a similarity between images of a plurality of modes such as two modes, the multi-task deep convolutional neural network model is established and trained. By using the trained multi-task deep convolutional neural network model, assisted diagnosis in two modes can be provided at the same time. In a case of the same amount of training data, using the similarity can improve prediction accuracy. Meanwhile, while maintaining certain prediction accuracy, demand for the amount of training data can be reduced. Because both acquisition of medical images and accurate labeling of the medical images are very time-consuming and labor-intensive, reducing the demand for the amount of training data can reduce research and development costs, and shorten a research and development cycle.

For example, when the image processing method provided in an embodiment of this application is applied to help the doctor perform endoscopy, for the white light image and the NBI image, automatic identification of a lesion property in the automatic endoscopy is performed, that is, the doctor can be assisted in identifying the lesion property based on the white light image, and the doctor can also be assisted in identifying the lesion property based on the NBI image, to improve diagnosis efficiency and accuracy of the doctor. The technical solution provided in this embodiment of this application can help the doctor reduce misdiagnosis during endoscopy, especially for a doctor who lacks relevant clinical experience, such as a doctor in a region without high incidence of digestive tract diseases.

It can be learned according to test data that, in a case that an NBI model is trained individually, a prediction accuracy rate thereof is 62.6% (accuracy rate=quantity of correctly predicted pictures/total quantity of pictures). However, by using the solution of combining multi-task learning and deep learning provided in this embodiment of this application, for the same test data and test method, the accuracy rate is increased to 72.4%.

Figure 14:
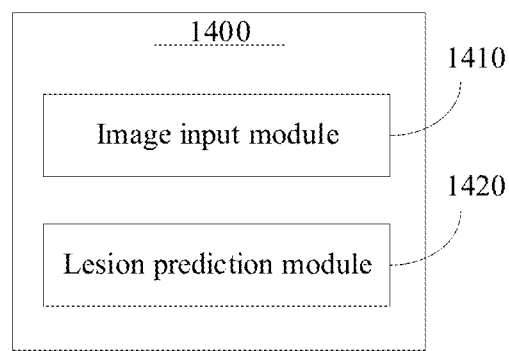
FIG. 14 is a schematic block diagram of an image processing apparatus according to an embodiment of this application.

FIG. 14 is a schematic block diagram of an image processing apparatus according to an embodiment of this application. The image processing apparatus may be disposed on a terminal device, or on a server, or partially on the terminal device and partially on the server, for example, on the terminal device 103 or the server 105 in FIG. 1 above. However, embodiments of this application are not limited thereto.

As shown in FIG. 14, the image processing apparatus 1400 provided in this embodiment of this application may include an image input module 1410 and a lesion prediction module 1420. One or more of the modules and/or submodules of the image processing apparatus 1400 can be implemented by processing circuitry, software, or a combination thereof, for example.

The image input module 1410 may be configured to input a to-be-predicted medical image into a model, the model being a multi-task deep convolutional neural network model, the model including an image input layer, a shared layer, and n parallel task output layers.

The lesion prediction module 1420 may be configured to output one or more lesion property prediction results of the to-be-predicted medical image through any one or more of the n task output layers.

The model is obtained through training of n types of medical image training sets, n being a positive integer greater than or equal to 2.

In an exemplary embodiment, the image processing apparatus 1400 may further include a model training module. The model training module may further include an image training set obtaining submodule and a model training submodule. The image training set obtaining submodule may be configured to obtain n types of medical image training sets. The model training submodule may be configured to sequentially input a selected quantity of medical images in the n types of medical image training sets to the image input layer of the model, and train the model.

In an exemplary embodiment, the image training set obtaining submodule may further include an image training set collecting unit and a training image labeling unit. The image training set collecting unit may be configured to collect medical images by using n modes of a medical imaging device (e.g., an endoscope). The training image labeling unit may be configured to label the medical images according to biopsy results corresponding to the collected medical images, and generate the n types of medical image training sets.

In an exemplary embodiment, in a case that n is equal to 2, the n types of medical image training sets may include a first type of medical image training set and a second type of medical image training set, two task output layers in the model respectively correspond to a task 1 and a task 2, the task 1 includes a task 1 loss function and a task 1 optimizer, and the task 2 includes a task 2 loss function and a task 2 optimizer.

The model training submodule may further include a first model training unit and a second model training unit. The first model training unit is configured to input $m_1$ medical images in the first type of medical image training set into the image input layer of the model, and optimize the task 1 optimizer according to the task 1 loss function, to update a shared parameter of the task 1 and the task 2, and an independent parameter of the task 1. The second model training unit may be configured to input $m_2$ medical images in the second type of medical image training set into the image input layer of the model, and optimize the task 2 optimizer according to the task 2 loss function, to update a shared parameter of the task 1 and the task 2, and an independent parameter of the task 2. Both $m_1$ and $m_2$ are positive integers greater than or equal to 1.

In an exemplary embodiment, in the model training process, the model training submodule may be invoked repeatedly to continue training the model.

In an exemplary embodiment, the image processing apparatus 1400 may further include a model pre-training module. The model pre-training module may be configured to pre-train the model by using a natural image training set.

In an exemplary embodiment, the to-be-predicted medical image may include a white light image and/or a narrow band image.

In an exemplary embodiment, the lesion property prediction results may include any one of normality, non-adenomatous polyps, adenomatous polyps, adenocarcinoma, and the like.

In an exemplary embodiment, the shared layer may include a convolution layer, a max pooling layer, a dense block 1, a transition layer 1, a dense block 2, a transition layer 2, a dense block 3, a transition layer 3, a dense block 4, and a global average pooling layer that are sequentially connected.

In an exemplary embodiment, each dense block may include K bottleneck layers, and input of an $i^{th}$ bottleneck layer in each dense block may include output of a first to an $(i-1)^{th}$ bottleneck layers in the corresponding dense block. i may be a positive integer greater than or equal to 2 and less than or equal to K.

In an exemplary embodiment, each bottleneck layer may include a batch normalization layer 1, a rectified linear unit 1, a convolution layer 1, a dropout layer 1, a batch normalization layer 2, a rectified linear unit 2, a convolution layer 2, and a dropout layer 2 that are sequentially connected.

In an exemplary embodiment, each task output layer may include a fully-connected layer.

For exemplary implementations of the modules in the image processing apparatus provided in the embodiments of this application, reference may be made to the content in the foregoing image processing method, and details are not described herein again.

Although several modules or units of a device for action execution are mentioned in the foregoing detailed descriptions, the division is not mandatory. In fact, according to the embodiments of this application, features and functions of two or more modules or submodules or units described above may be specified in one module or submodule or unit. Conversely, the features or functions of one module or submodule or unit or subunit described above may further be divided and embodied by a plurality of modules or submodules or units or subunits.

Through descriptions of the foregoing implementations, a person skilled in the art can easily understand that the exemplary implementations described herein may be implemented by software or by combining software with necessary hardware. Therefore, the technical solutions of the embodiments of this application may be implemented in a form of a software product, including a non-transitory computer-readable storage medium for example. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the present disclosure, a person skilled in the art may conceive of other implementations of this application. This application is intended to cover any variations, uses or adaptive changes of this application following the general principles of this application, and includes the well-known knowledge and conventional technical means in the art and undisclosed in this application. The specification and the embodiments are considered as merely exemplary.

It is to be understood that this application is not limited to the precise structures described above and shown in the accompanying drawings, and various modifications and changes can be made without departing from the scope of this application.

What is claimed is:

1. An image processing method, comprising:
    inputting, by processing circuitry of an image processing apparatus, a to-be-predicted medical image into a multi-task deep convolutional neural network model, the multi-task deep convolutional neural network model including an image input layer, a shared layer, and n parallel task output layers, the n parallel task output layers each comprising separate loss functions and separate optimizers and each outputting a separate prediction based on a corresponding type of medical image; and
    outputting, by the processing circuitry, one or more lesion property prediction results of the to-be-predicted medical image through one or more of the n task output layers, wherein
    the multi-task deep convolutional neural network model is trained with n types of medical image training sets, n being a positive integer that is greater than or equal to 2.

2. The image processing method according to claim 1, before the inputting, the method further comprising:
    obtaining the n types of medical image training sets; and
    sequentially inputting a selected quantity of medical images in the n types of medical image training sets into the image input layer of the multi-task deep convolutional neural network model to train the multi-task deep convolutional neural network model.

3. The image processing method according to claim 2, wherein the obtaining comprises:
    collecting medical images by using n modes of a medical imaging device; and
    labeling the medical images according to biopsy results corresponding to the collected medical images to generate the n types of medical image training sets.

4. The image processing method according to claim 2, wherein in a case that n is equal to 2,
    the n types of medical image training sets includes a first type of medical image training set and a second type of medical image training set, two task output layers in the multi-task deep convolutional neural network model respectively correspond to a task 1 and a task 2, the task 1 includes a task 1 loss function and a task 1 optimizer, and the task 2 includes a task 2 loss function and a task 2 optimizer; and
    the sequentially inputting includes
    inputting $m_1$ medical images in the first type of medical image training set into the image input layer of the multi-task deep convolutional neural network model, and optimizing the task 1 optimizer according to the task 1 loss function, to update a shared parameter of the task 1 and the task 2, and an independent parameter of the task 1; and
    inputting $m_2$ medical images in the second type of medical image training set into the image input layer of the multi-task deep convolutional neural network model, and optimizing the task 2 optimizer according to the task 2 loss function, to update a shared parameter of the task 1 and the task 2, and an independent parameter of the task 2,
    wherein both $m_1$ and $m_2$ are positive integers that are greater than or equal to 1.

5. The image processing method according to claim 2, further comprising:
    repeatedly performing the sequentially inputting of the selected quantity of medical images to train the multi-task deep convolutional neural network model.

6. The image processing method according to claim 1, further comprising:
    pre-training the multi-task deep convolutional neural network model with a natural image training set.

7. The image processing method according to claim 1, wherein the to-be-predicted medical image includes one of a white light image and a narrow band image.

8. The image processing method according to claim 1, wherein the one or more lesion property prediction results include at least one of normality, non-adenomatous polyps, adenomatous polyps, or adenocarcinoma.

9. The image processing method according to claim 1, wherein the shared layer includes a convolution layer, a max pooling layer, a dense block 1, a transition layer 1, a dense block 2, a transition layer 2, a dense block 3, a transition layer 3, a dense block 4, and a global average pooling layer that are sequentially connected.

10. The image processing method according to claim 9, wherein
each dense block includes K bottleneck layers, and input of an $i^{th}$ bottleneck layer in each dense block includes output of a first to an $(i-1)^{th}$ bottleneck layers in the corresponding dense block; and
i is a positive integer that is greater than or equal to 2 and less than or equal to K; and K is a positive integer that is greater than or equal to 2.

11. The image processing method according to claim 10, wherein each bottleneck layer includes a batch normalization layer 1, a rectified linear unit 1, a convolution layer 1, a dropout layer 1, a batch normalization layer 2, a rectified linear unit 2, a convolution layer 2, and a dropout layer 2 that are sequentially connected.

12. The image processing method according to claim 1, wherein each of the n task output layers includes a fully-connected layer.

13. An image processing apparatus, comprising:
processing circuitry configured to:
input a to-be-predicted medical image into a multi-task deep convolutional neural network model, the multi-task deep convolutional neural network model including an image input layer, a shared layer, and n parallel task output layers, the n parallel task output layers each comprising separate loss functions and separate optimizers and each outputting a separate prediction based on a corresponding type of medical image; and
output one or more lesion property prediction results of the to-be-predicted medical image through one or more of the n task output layers, wherein
the multi-task deep convolutional neural network model is trained with n types of medical image training sets, n being a positive integer greater than or equal to 2.

14. The image processing apparatus according to claim 13, wherein the processing circuitry is configured to:
obtain the n types of medical image training sets; and
sequentially input a selected quantity of medical images in the n types of medical image training sets into the image input layer of the multi-task deep convolutional neural network model to train the multi-task deep convolutional neural network model.

15. The image processing apparatus according to claim 14, wherein the processing circuitry is configured to:
collect medical images by using n modes of a medical imaging device; and
label the medical images according to biopsy results corresponding to the collected medical images to generate the n types of medical image training sets.

16. The image processing apparatus according to claim 14, wherein in a case that n is equal to 2,
the n types of medical image training sets includes a first type of medical image training set and a second type of medical image training set, two task output layers in the multi-task deep convolutional neural network model respectively correspond to a task 1 and a task 2, the task 1 includes a task 1 loss function and a task 1 optimizer, and the task 2 includes a task 2 loss function and a task 2 optimizer; and
the processing circuitry is configured to:
input $m_1$ medical images in the first type of medical image training set into the image input layer of the multi-task deep convolutional neural network model, and optimize the task 1 optimizer according to the task 1 loss function, to update a shared parameter of the task 1 and the task 2, and an independent parameter of the task 1; and
input $m_2$ medical images in the second type of medical image training set into the image input layer of the multi-task deep convolutional neural network model, and optimize the task 2 optimizer according to the task 2 loss function, to update a shared parameter of the task 1 and the task 2, and an independent parameter of the task 2,
wherein both $m_1$ and $m_2$ are positive integers that are greater than or equal to 1.

17. The image processing apparatus according to claim 14, wherein the processing circuitry is configured to:
repeatedly sequentially input the selected quantity of medical images to train the multi-task deep convolutional neural network model.

18. The image processing apparatus according to claim 13, wherein the processing circuitry is configured to:
pre-train the multi-task deep convolutional neural network model with a natural image training set.

19. The image processing apparatus according to claim 13, wherein the to-be-predicted medical image includes one of a white light image and a narrow band image.

20. A non-transitory computer-readable storage medium, storing instructions which when executed by at least one processor cause the at least one processor to perform:
inputting a to-be-predicted medical image into a multi-task deep convolutional neural network model, the multi-task deep convolutional neural network model including an image input layer, a shared layer, and n parallel task output layers, the n parallel task output layers each comprising separate loss functions and separate optimizers and each outputting a separate prediction based on a corresponding type of medical image; and
outputting one or more lesion property prediction results of the to-be-predicted medical image through one or more of the n task output layers, wherein
the multi-task deep convolutional neural network model is trained with n types of medical image training sets, n being a positive integer that is greater than or equal to 2.

* * * * *